United States Patent
Hall et al.

(10) Patent No.: US 7,733,240 B2
(45) Date of Patent: Jun. 8, 2010

(54) SYSTEM FOR CONFIGURING HARDWARE IN A DOWNHOLE TOOL

(75) Inventors: David R. Hall, Provo, UT (US); Monte L. Johnson, Orem, UT (US)

(73) Assignee: IntelliServ LLC, Houston, TX (US)

( * ) Notice: Subject to any disclaimer, the term of this patent is extended or adjusted under 35 U.S.C. 154(b) by 1281 days.

(21) Appl. No.: 11/163,096

(22) Filed: Oct. 5, 2005

(65) Prior Publication Data

US 2006/0033637 A1 Feb. 16, 2006

Related U.S. Application Data

(63) Continuation-in-part of application No. 10/710,638, filed on Jul. 27, 2004, now Pat. No. 7,274,304.

(51) Int. Cl.
*G01V 3/00* (2006.01)
(52) U.S. Cl. .............. 340/853.2; 340/855.4; 340/854.6; 340/853.9; 340/853.3
(58) Field of Classification Search .............. 340/855.4, 340/853.2, 854.6, 853.9, 853.3
See application file for complete search history.

(56) References Cited

U.S. PATENT DOCUMENTS

| | | | |
|---|---|---|---|
| 2,414,719 A | | 1/1947 | Cloud |
| 3,518,608 A | | 6/1970 | Papadopoulos |
| 4,739,325 A | | 4/1988 | MacLeod |
| 4,788,544 A | | 11/1988 | Howard |
| 4,815,076 A | | 3/1989 | Denney et al. |
| 5,331,318 A | * | 7/1994 | Montgomery ............ 340/855.4 |
| 5,959,547 A | * | 9/1999 | Tubel et al. .............. 340/853.2 |
| 6,012,015 A | | 1/2000 | Tubel |
| 6,061,633 A | | 5/2000 | Fukuhara et al. |
| 6,252,518 B1 | * | 6/2001 | Laborde ................... 340/855.4 |
| 6,392,317 B1 | | 5/2002 | Hall et al. |
| 6,630,890 B1 | * | 10/2003 | Endo et al. ............... 340/853.9 |
| 6,670,880 B1 | | 12/2003 | Hall et al. |
| 6,688,396 B2 | | 2/2004 | Floerke et al. |
| 6,717,501 B2 | | 4/2004 | Hall et al. |
| 6,799,632 B2 | | 10/2004 | Hall et al. |
| 6,821,147 B1 | | 11/2004 | Hall et al. |
| 6,826,175 B1 | | 11/2004 | Gammenthaler, Jr. et al. |
| 6,830,467 B2 | | 12/2004 | Hall et al. |
| 6,844,498 B2 | | 1/2005 | Hall et al. |
| 6,866,306 B2 | | 3/2005 | Boyle et al. |
| 6,888,473 B1 | | 5/2005 | Hall et al. |
| 6,913,093 B2 | | 7/2005 | Hall et al. |
| 6,929,493 B2 | | 8/2005 | Hall et al. |
| 6,945,802 B2 | | 9/2005 | Hall et al. |

(Continued)

OTHER PUBLICATIONS

PCT/US03/16475, Published Dec. 4, 2003, Applicant Baker Hughes; International Search Report: "Documents Considered to Be Relevent".

*Primary Examiner*—Albert K Wong
(74) *Attorney, Agent, or Firm*—Victor Segura; Daniel P. Nelson

(57) ABSTRACT

A system for loading a hardware configuration into downhole configurable hardware includes a surface control unit in communication with a downhole tool string component over a downhole network. The surface control unit initially has the hardware configuration and transmits it through the downhole network to the configurable hardware. The hardware configuration is implemented in the configurable hardware. The configurable hardware is preferably an FPGA.

19 Claims, 10 Drawing Sheets

U.S. PATENT DOCUMENTS

| | | |
|---|---|---|
| 6,968,611 B2 | 11/2005 | Hall et al. |
| 7,042,367 B2 * | 5/2006 | Gardner et al. ............ 340/853.3 |
| 7,075,454 B2 * | 7/2006 | Hirsch et al. ............. 340/854.6 |
| 2004/0039466 A1 | 2/2004 | Lilly et al. |
| 2004/0104797 A1 | 6/2004 | Hall et al. |
| 2004/0113808 A1 | 6/2004 | Hall et al. |
| 2004/0145492 A1 | 7/2004 | Hall et al. |
| 2004/0150532 A1 | 8/2004 | Hall et al. |
| 2004/0164833 A1 | 8/2004 | Hall et al. |
| 2004/0164838 A1 | 8/2004 | Hall et al. |
| 2004/0216847 A1 | 11/2004 | Hall et al. |
| 2004/0244916 A1 | 12/2004 | Hall et al. |
| 2004/0244964 A1 | 12/2004 | Hall et al. |
| 2004/0246142 A1 | 12/2004 | Hall et al. |
| 2005/0001735 A1 | 1/2005 | Hall et al. |
| 2005/0001736 A1 | 1/2005 | Hall et al. |
| 2005/0001738 A1 | 1/2005 | Hall et al. |
| 2005/0035874 A1 | 2/2005 | Hall et al. |
| 2005/0035875 A1 | 2/2005 | Hall et al. |
| 2005/0035876 A1 | 2/2005 | Hall et al. |
| 2005/0036507 A1 | 2/2005 | Hall et al. |
| 2005/0039912 A1 | 2/2005 | Hall et al. |
| 2005/0045339 A1 | 3/2005 | Hall et al. |
| 2005/0046586 A1 | 3/2005 | Hall et al. |
| 2005/0046590 A1 | 3/2005 | Hall et al. |
| 2005/0067159 A1 | 3/2005 | Hall et al. |
| 2005/0070144 A1 | 3/2005 | Hall et al. |
| 2005/0082092 A1 | 4/2005 | Hall et al. |
| 2005/0092499 A1 | 5/2005 | Hall et al. |
| 2005/0093296 A1 | 5/2005 | Hall et al. |
| 2005/0095827 A1 | 5/2005 | Hall et al. |
| 2005/0115717 A1 | 6/2005 | Hall et al. |
| 2005/0145406 A1 | 7/2005 | Hall et al. |
| 2005/0150653 A1 | 7/2005 | Hall et al. |
| 2005/0161215 A1 | 7/2005 | Hall et al. |
| 2005/0173128 A1 | 8/2005 | Hall et al. |
| 2005/0212530 A1 | 9/2005 | Hall et al. |
| 2005/0236160 A1 | 10/2005 | Hall et al. |
| 2005/0279508 A1 | 12/2005 | Hall et al. |
| 2005/0284659 A1 | 12/2005 | Hall et al. |
| 2005/0284662 A1 | 12/2005 | Hall et al. |
| 2005/0284663 A1 | 12/2005 | Hall et al. |
| 2005/0285645 A1 | 12/2005 | Hall et al. |
| 2005/0285705 A1 | 12/2005 | Hall et al. |
| 2005/0285706 A1 | 12/2005 | Hall et al. |
| 2005/0285751 A1 | 12/2005 | Hall et al. |
| 2005/0285752 A1 | 12/2005 | Hall et al. |
| 2005/0285754 A1 | 12/2005 | Hall et al. |

* cited by examiner

SYSTEM FOR CONFIGURING HARDWARE IN A DOWNHOLE TOOL

CROSS REFERENCE TO RELATED APPLICATIONS

The present application is a continuation-in-part of U.S. application Ser. No. 10/710,638 filed Jul. 27, 2004 to Hall, et. al. which is herein incorporated by reference.

BACKGROUND OF THE INVENTION

This invention relates to a system for loading executable code to volatile memory in a downhole tool, specifically to downhole tools that are part of a downhole tool string. Software for downhole tools on a downhole tool string need to be programmed for numerous conditions. New software may require constant updates to fix errors that result from unforeseen conditions for which the software was not designed. Under some circumstances it is also beneficial to provide specialized software to a downhole tool so that it may perform unique and/or specialized tasks according to the software it has loaded. U.S. Pat. No. 6,670,880 (hereafter referred to as the '880 patent), which is herein incorporated by reference, discloses a system for transmitting data through a string of downhole components. In one aspect of the invention in the '880 patent, the system includes first and second magnetically-conductive electrically-insulating elements at both ends of the components. Each element includes a U-shaped trough with a bottom, first and second sides and an opening between the two sides. Electrically conducting coils are located in each trough. An electrical conductor connects the coils in each component. This architecture allows transmission of a signal through the string of downhole components and connects downhole tools to equipment located on the surface. The tools located in the bottom hole assembly and tools located along the string of downhole components require executable code to perform their operations.

Updating the executable code of downhole tools complicate the operations of the on-site crew. Errors in the executable code may require portions of the executable code to be rewritten. Loading new software requires a substantial amount executable code to be written to the downhole tool. Often removing the entire downhole tool string is required to access the executable code, which is costly and time consuming. It is not uncommon for a drill string to be 20,000 feet long. Further complicating the matter is the cost associated with the processors for downhole tools. Due to the extreme conditions downhole, high temperature processors are required for the downhole tools. The transmission system disclosed in the '880 patent is capable of operating many tools at once due to its high speed ability. The combined cost of all of the processors in the downhole tools may add to several million dollars, which increases if errors in the executable code require replacements.

Attempts at resolving the problems associated with software failures and errors in downhole tools are recognized in the industry. Designing redundant systems with back up processors is one approach. U.S. Pat. No. 4,815,076 discloses a machine implemented process for advisement on several alternatives for recovering from a single or multiple component failures in a distributed process well-site instrumentation logging system. In this process, when a critical part of the downhole system has failed, the role of a failed processor may be shifted to another processor and the software failure may be overcome.

U.S. Pat. No. 6,061,633 proposes a sonde that includes signal processing means according to a predetermined signal processing program, first memory means for storing that signal processing program, and second memory means storing a writing program for writing the signal processing program in the first memory means. The sonde's software may be written at the surface, sent over a cable to the sonde, and rebooted from the surface. To avoid removing the sonde every time an error is discovered in the system, the rewritten software is written in electrically erasable programmable read only memory (EEPROM). Due to the limitations of EEPROM, the sonde keeps track of the number of times that the sonde is reprogrammed and after a determined number of reprogrammings, the sonde is retrieved and the EEPROM is replaced. This system reduces the number of times that a downhole tool's software needs to be replaced, but there is still a significant amount of non-volatile memory downhole.

BRIEF SUMMARY OF THE INVENTION

Briefly stated, the invention is a system and method for loading a hardware configuration into downhole configurable hardware.

In accordance with one aspect of the invention, the system includes a surface control unit at the surface of a drilling or production well site. The surface control unit comprises a hardware configuration, preferably stored as binary data, transmits it over a downhole network integrated into a tool string to configurable hardware in a downhole tool component. The downhole network is preferably the one described in the aforementioned '880 patent. However other compatible systems for transmitting data from the surface to a downhole component are disclosed in U.S. Pat. Nos. 6,688,396 and 6,641,434 to Floerke and Boyle respectively, both of which are herein incorporated by reference. The downhole string component is preferably a node in the downhole network or a tool in the tool string such as a jar, a motor, a shock absorber, a hammer, or a drill bit, all of which may be associated with a node in the downhole network.

The hardware configuration transmitted over the downhole network is implemented in the configurable hardware, which is preferably a field programmable gate array (FPGA). The hardware configuration may adapt the configurable hardware to be able to perform one or more desired downhole tasks. The downhole tool component itself may comprise modems, application-specific integrated circuits (ASICs), and/or processors that may be in electrical communication with and the configurable hardware and even assist in implementing the hardware configuration. In certain embodiments, the surface control unit may receive the hardware configuration from a third party such as a tool vendor through an external network such as the internet.

In accordance with another aspect of the invention, a method for adapting configurable hardware to downhole operations in a downhole tool string component includes the steps of transmitting a hardware configuration over a downhole network from a surface control unit to the downhole tool string component and implementing the received hardware configuration in the configurable hardware. In certain embodiments the downhole tool string component may request the hardware configuration from the surface control unit over the integrated downhole network. These requests may be made automatically upon reading an instruction in boot memory, but changing downhole hardware requirements may also require the downhole tool string component to request a new hardware configuration. In additional embodiments, the hardware configuration may be received by the surface control unit through an external network such as a local area network or the internet.

DETAILED DESCRIPTION OF THE INVENTION AND THE PREFERRED EMBODIMENT

This specification is meant to illustrate the present invention and not limit its scope. Other embodiments of the present invention are possible within the scope and spirit of the claims.

Figure 1:
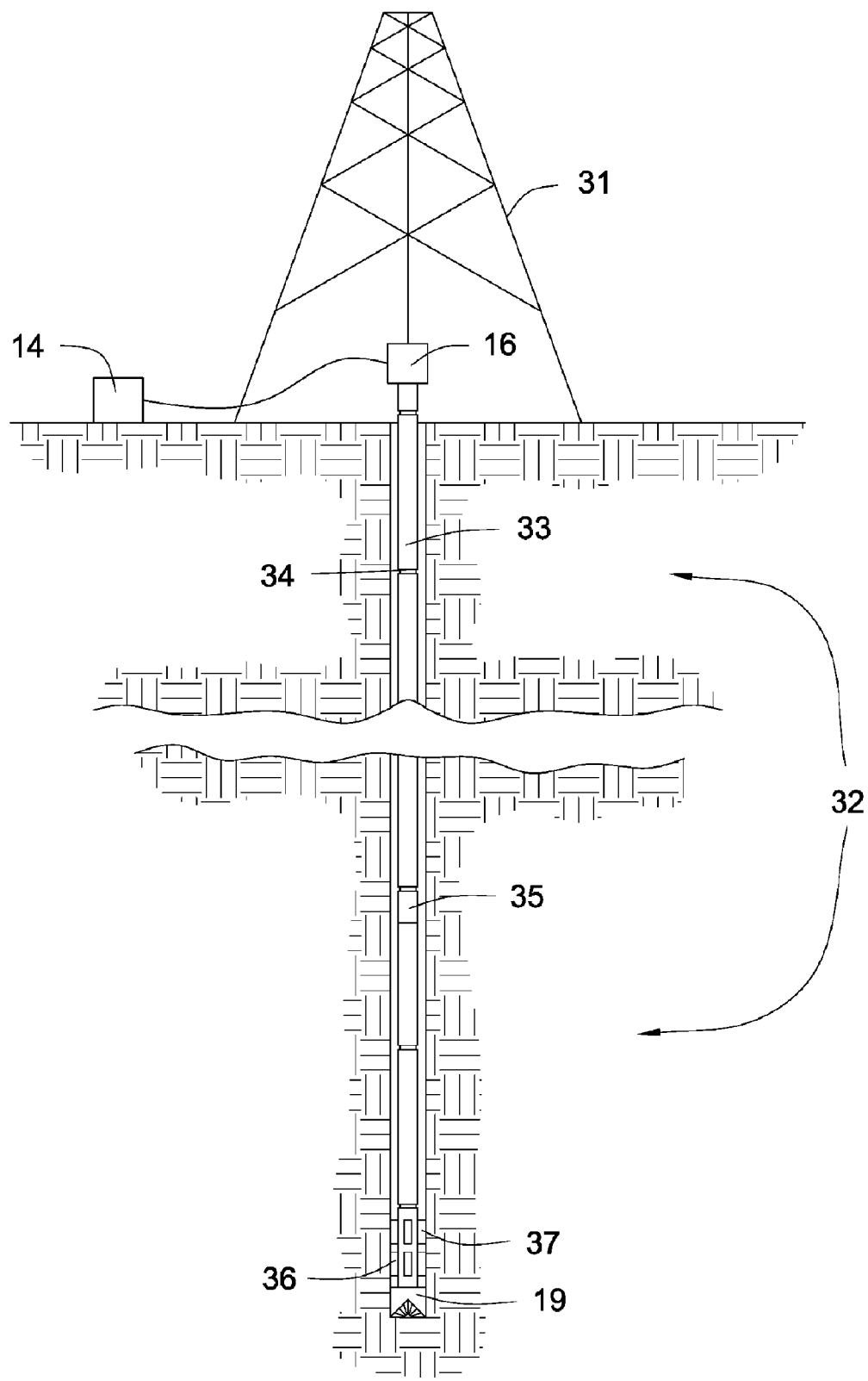
FIG. 1 is a perspective view of an embodiment of a downhole tool string.

FIG. 1 shows an embodiment of a downhole tool string 32 in a bore hole. The downhole tool string 32 may be a drill string or it may be part of a production well. A derrick 31 suspends the downhole tool string 32. A data swivel 16 connects the surface control unit 14 to the downhole tool string 32. Components 33 of the downhole tool string 32 may be pipes wherein each pipe comprises a box end and a pin end. The pin end and box end connect together and form a joint 34 in the downhole tool string 32. In the preferred embodiment there are inductive couplers in the pin end and box end of the components 33 of the downhole tool string 32. Alternatively direct electrical couplers may be used.

Examples of tools on a bottom hole assembly 19 comprise sensors, drill bits, motors, hammers, and steering elements. Examples of tools 18 located along the downhole tool string 32 are nodes, jars 35, seismic sources 36, seismic receivers 37, and sensors, and other tools that aid in the operations of the downhole tool string 32. Different sensors are useful downhole such as pressure sensors, temperature sensors, inclinometers, thermocouplers, accelerometers, and imaging devices.

Figure 2:
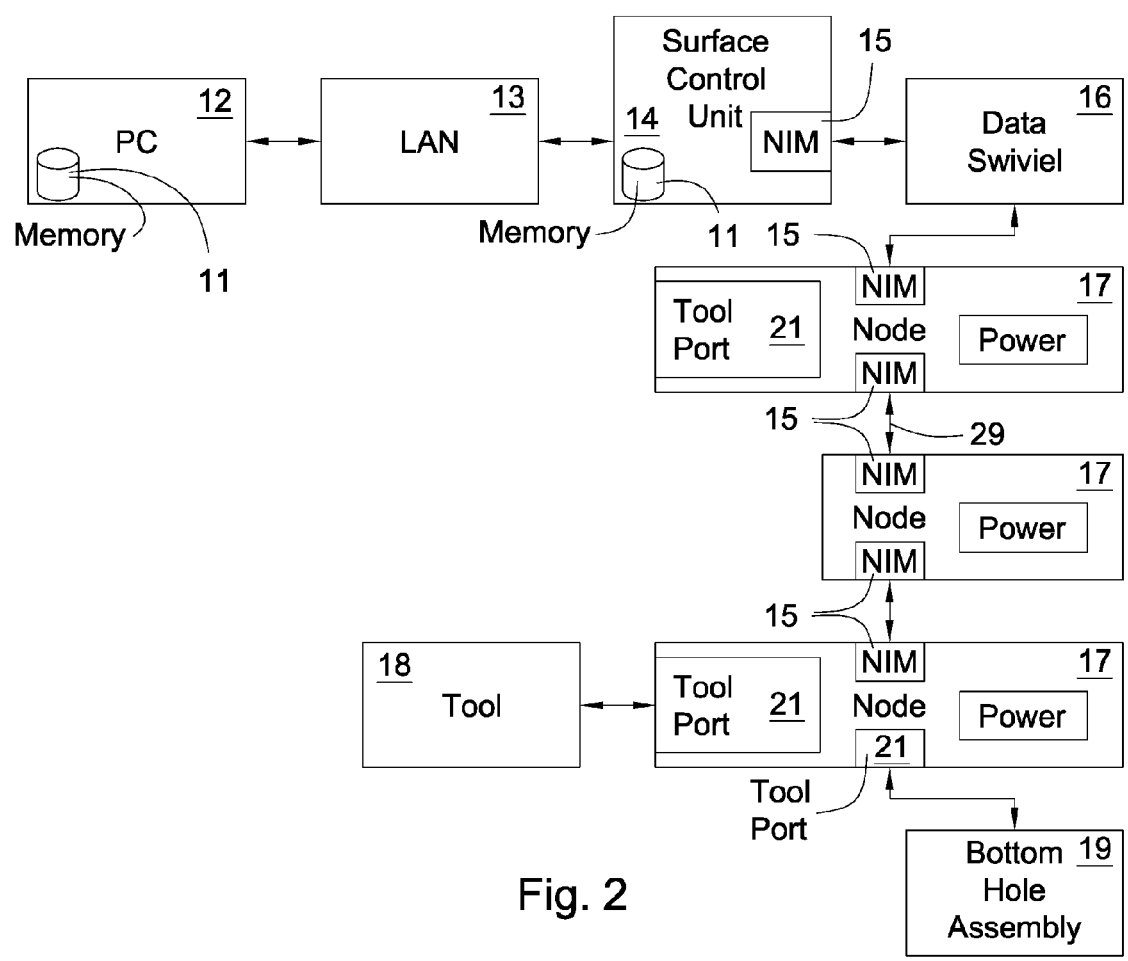
FIG. 2 is a schematic block diagram of an embodiment of a downhole network.

FIG. 2 shows a schematic diagram of an embodiment of integrated downhole network 29. The surface control unit 14 connects to the data swivel 16, which maintains an electric connection to the downhole network 29 integrated into the downhole tool string 32. The nodes 17, in the downhole network 29, may comprise a repeater, at least one NIM 15, a tool port 21, a power source 45, and other electronic components. The integrated downhole network 29 may be capable of transmitting information faster than 20 kilobits per second; preferably, faster then 100 kilobits per second. More preferably, the transmission system may be capable of transmitting data faster than 1 megabit per second. In the preferred embodiment, each downhole component 33 comprises a single coaxial cable connecting transmission elements in the ends of the joints 34 of the downhole tool string 32. Alternatively, the integrated downhole network 29 may comprises additional electrical pathways from the downhole tool 18 to the surface control unit 14. Preferably, the electrical pathway is an electrical conductor capable of transmitting a data signal or a power signal. The electrical pathway may comprise a coaxial cable, a copper wire, a fiber optics cable, or other type of cable.

Executable codes may be stored in memory 11 in the surface control unit 14. The surface control 14 unit may be a personal computer. Alternatively, the surface control unit 14 may be connected to a personal computer 12 over a local area network 13. Executable codes are copies of memory stored in non-volatile memory that may be loaded into volatile memory, such as the volatile memory of a node 17, tool 18, or bottom hole assembly 19. Examples of executable codes include software, operating systems, at least part of an operating system, at least one calibration constant, at least one data file, and at least one instruction code. The storage 11 of the surface control unit 14 may comprise non-volatile memory or volatile memory. The non-volatile memory may be associated with a hard drive. The volatile memory may be associated with a removable medium (e.g. floppy disk, zip disk) or in a removable drive (e.g. USB drive, removable hard drive). A removable medium allows the workers to program software away from the on-site location and also provides a back up to any non-volatile memory in the surface control unit 14. Non-volatile memory in the surface control unit 14 may be a type of ROM, such as EPROM and EEPROM. In the preferred embodiment, the executable codes are stored on a hard drive in the surface control unit 14. Also in the preferred embodiment, the surface control unit 14 comprises a form of ROM and also RAM 25. The ROM may store the executable code for downhole volatile memory in the downhole tools 18.

The surface control unit 14 also stores data from the downhole tools 18 such as measurements from the sensors. In the preferred embodiment, the surface control unit 14 has a user interface so the on-site crew may access the downhole data.

A local area network 13 may connect the surface control to computers 12 all around the world, through the internet. Updates may be written by the manufacturer without the manufacturer coming to on-site locations, or without delivering updates to the on-site locations. Updates may fix errors in the operating system or may replace older versions of the tool's software. On-line access allows the manufacturer to monitor their tools 18 while the tools 18 operate downhole. Drill strings are usually rented, so companies want to maximize their drilling time. The operating systems that run the downhole tools 18 may experience situations that were unforeseen during its programming. A quick recovery to errors may increase a company's profit.

When an error is discovered, the manufacturer may fix the problem by rewriting all or a portion of the program and then sending it through the internet to the surface control unit 14. Other on-sites locations not experiencing a particular error may receive the same updates avoiding the same experience. The manufacturer may have the executable codes stored on their server and the executable codes may be received over the local area network 13. Preferably, the manufacturer backs up the executable codes. Alternatively, the manufacturer's server may be the primary location for the executable codes.

The downhole tool string 32 may comprises tools 18 made by different manufacturers. The surface control unit 14 may store executable codes for the different tools 18 from different manufactures. Storing the executable codes in the processor 30 of the downhole tools 18 in non-volatile memory is expensive. Loading the executable codes from the surface control unit 14 into downhole volatile memory eliminates the need for most of the non-volatile memory downhole. Reducing the amount of non-volatile memory downhole greatly reduces costs. One processor in the surface control unit 14 that stores all of the executable codes for the downhole tools 18 on the downhole tool string 32 may be expensive, but the cost of this processor compared to the cost of all of the processors in the downhole tools 18, may be significantly cheaper. Further, the non-volatile memory storage in the surface control unit 14 may not experience the same extreme conditions as the downhole tools 18 and may be stored by a less expensive means.

Figure 3:
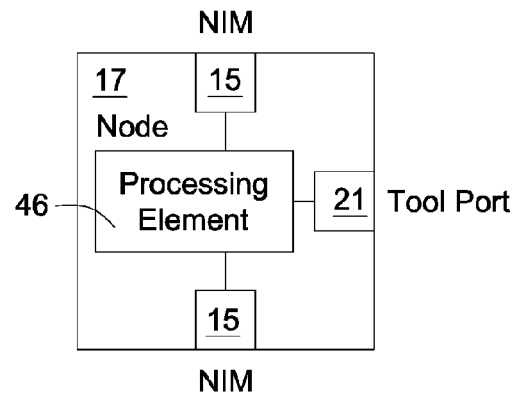
FIG. 3 is a schematic block diagram of an embodiment of a network interface modem.

The surface control unit 14 comprises a NIM 15. Preferably, the NIM 15 translates the binary form of the executable code to an analogue form to be transmitted downhole via the downhole network 29. Preferably, each downhole tool 18 along the downhole network 29 is also associated with a node 17. Alternatively, the downhole tool 18 may comprise the NIM 15. An embodiment of the node 17 is disclosed in FIG. 3.

Figure 4:
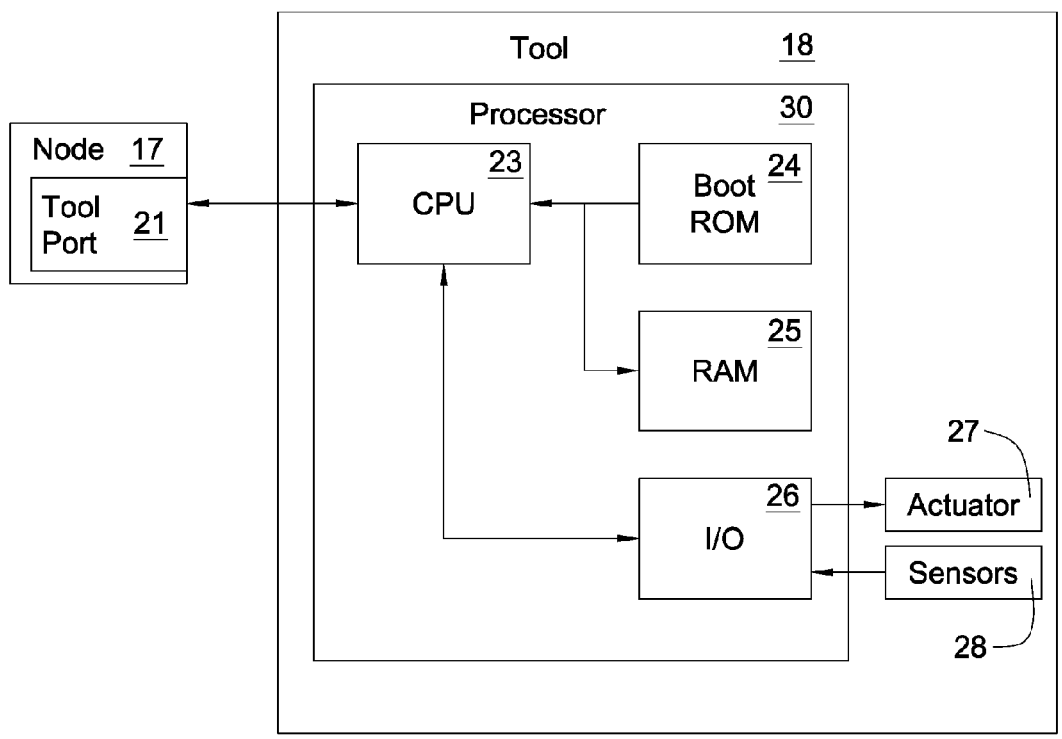
FIG. 4 is a schematic block diagram of an embodiment of a processor in a downhole tool.

The processing element 46 determines, based off of a packet header, where to send a packet. If the packet header indicates that the packet's address is for an associated tool 18 then the packet is passed to the processor 30 of that downhole tool 18 as shown in FIG. 4. The packet leaves the node 17 through the tool port 21. If the packet header indicates that the packet belongs in another destination, then the processing element 46 sends the packet out through a NIM 15. The network 29 in the preferred embodiment uses QPSK to modulate the packets, but other embodiments include CW, OOK, PCM, FSK, QAM or similar modulation types. Packets in the downhole network 29 may be like any packets known in the art. The network 29 may follow the protocols of collision based networks, token based networks, or other types of networks.

FIG. 4 shows a schematic block diagram of an embodiment of a processor 30 in a downhole tool 18. A central processing unit (CPU) 23 directs a packet of at least part of an executable code to RAM 25 and the executable code is written into RAM 25. Other volatile memory types may be used in other embodiments of the present invention. The CPU 23 may also interact with an I/O interface 26, which operates actuators 27 and sensors 28. The executable code may be a software executable code for the operations of the tool 18, including the downhole tool's operating system or calibration constants needed to perform its operations. The executable code may be a data file. The time of day and other useful types of information may be sent to the processors 30 in downhole tools 18 as well. Other executable codes may include codes for the tool 18 to synchronize its operations with other tools, set parameters, reset registers, read registers, find the status of devices downhole, and perform other requests.

Figure 5:
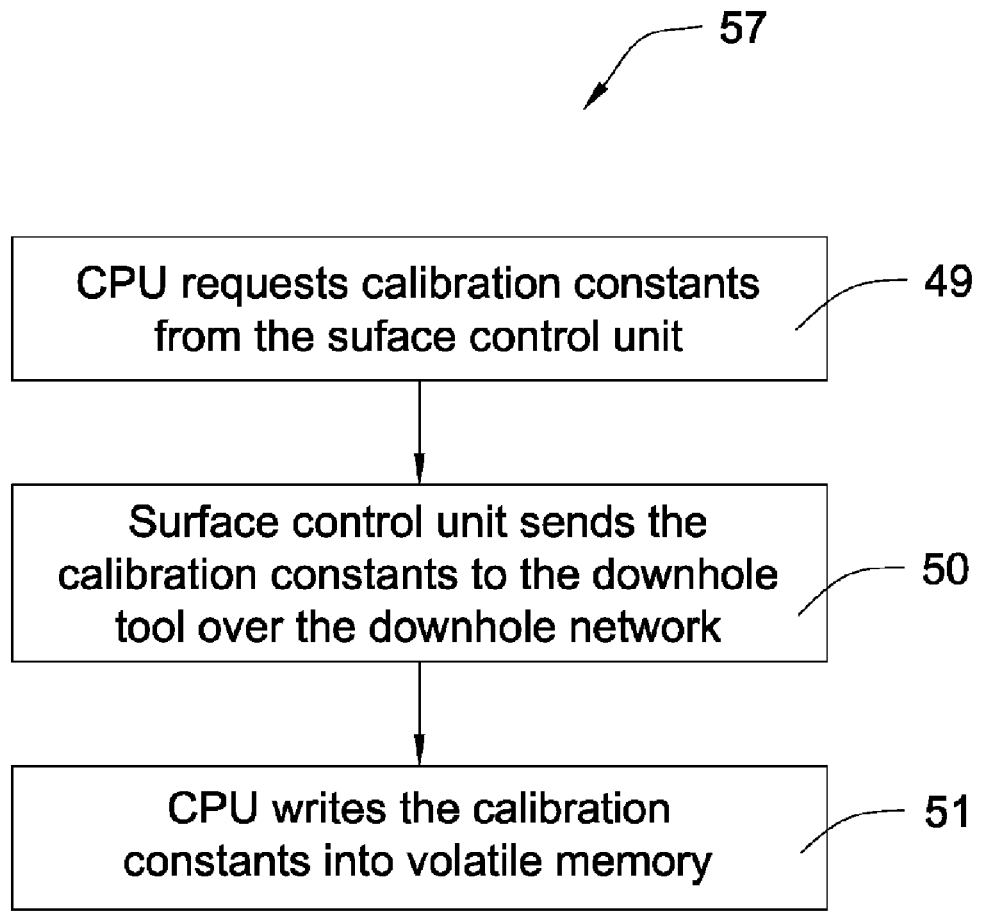
FIG. 5 is a block diagram of an embodiment of a method for loading an executable code.

An embodiment of a method 57 for retrieving calibration constants is illustrated in FIG. 5. The first step 49 comprises the CPU requesting calibration constants from the surface control unit 14. The operating system may indicate to the CPU 23 that calibration constants are needed to set parameters for the downhole tool 18 to operate. During a second step 50 the surface control unit 14 sends the calibration constants to the downhole tool 18 over the downhole network 29. The processing elements 46 direct the packets containing the calibration constants to the correct downhole tool 18. Upon receiving the calibration constants, another step 51 is performed, where the CPU 23 writes the calibration constants into the volatile memory. Preferably, the volatile memory is RAM 25.

Once the executable codes are written in RAM 25, the CPU 23 may read from the RAM 25 on how to operate the downhole tool 18. The CPU 23 sends instructions to the I/O interface 26 that receives data from sensors 28 and sends signals to actuators 27. The data gained by the sensors 28 is sent to the surface control unit 14 where it is stored and easily accessible to the on-site crew.

In the preferred embodiment, the processors 30 are designed to comprise the least amount of ROM as possible. ROM, EPROM, and EEPROM are heat sensitive, which make using non-volatile memory downhole expensive and difficult. The processors 30 downhole need to be designed to handle high temperatures. High temperature resistant processors may be expensive and fewer high-temperature processors downhole reduce costs for the entire downhole network 29. In the preferred embodiment, the only ROM in the processors 30 of the downhole tool 18 is the boot ROM 24.

In the preferred embodiment, boot memory 24 is necessary for the processor 30 to operate. When the downhole tool 18 makes electrical contact with a power source, electricity flows into the circuits of the processor 30. The boot ROM 24 is awakened by the electrical current and sends a one-way signal to the CPU 23 requesting the CPU 23 to retrieve an executable code of the processor's operating system. The CPU 23 requests the executable code from the surface control unit 14. The packets sent by the CPU 23 include an identification of the tool 18 that sent the request. This identification may be a manufacturer number, a serial number, or a model number. The identification tells the surface control unit 14, which operating system's executable code to retrieve. The operating system's executable code is sent back to the CPU 23 and is loaded into the RAM 25.

Figure 6:
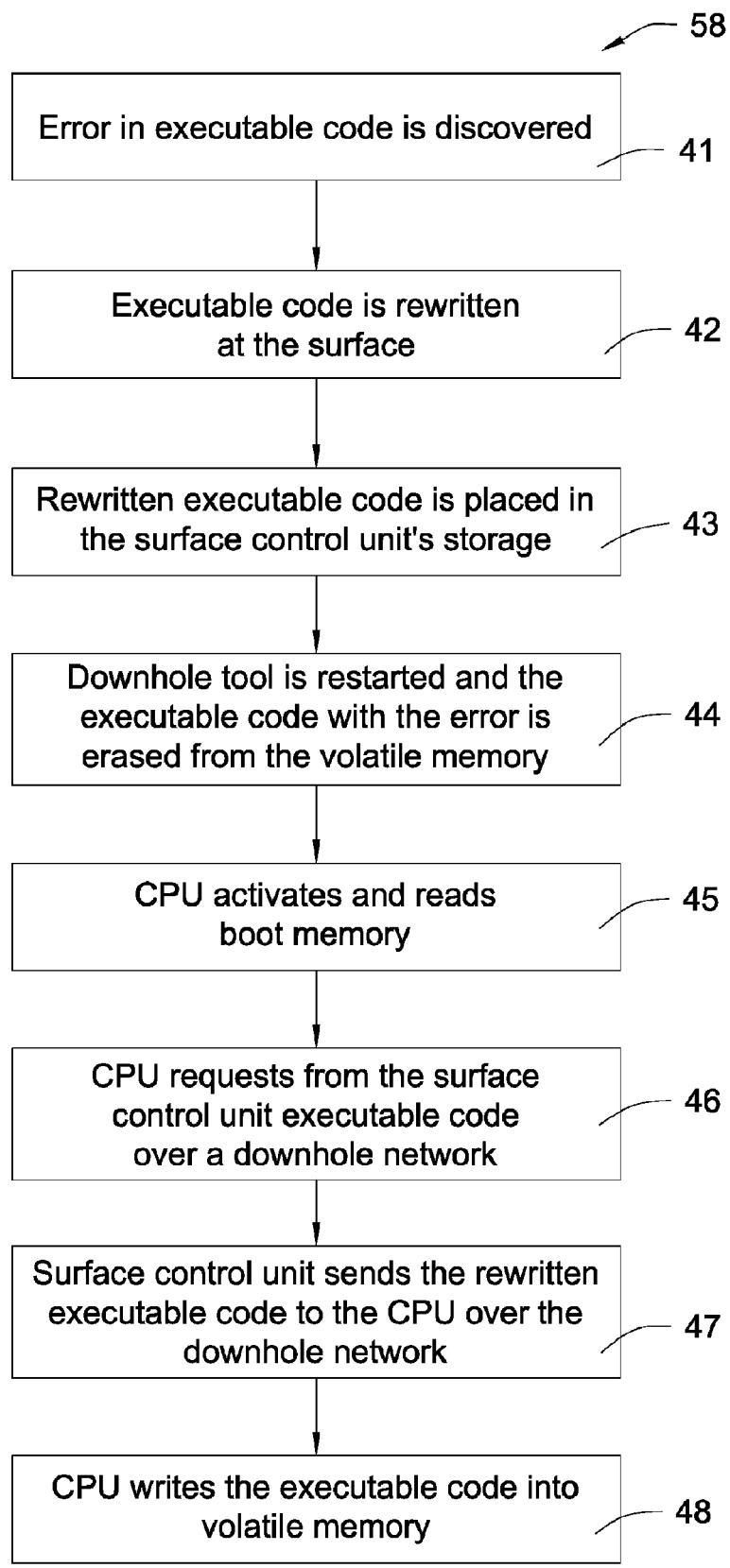
FIG. 6 is a block diagram of an embodiment of a method for loading an executable code.

An embodiment for a method 58 for correcting errors in downhole tools 18 is shown in FIG. 6. The first step 41 comprises discovering an error in some executable code. An error may be discovered in a downhole tool 18 when the downhole tool 18 doesn't operate properly. The executable code may be analyzed from the surface control unit 14. A next step 42 is rewriting the executable code. The code may be written at or near the drilling site, or it may be written else where and sent over the local area network 13. Step 43 comprises loading the rewritten executable code into the surface control unit 14. This may be done by uploading it over the local area network 13 or from a removable media. The next step 44 starts a rebooting process. The downhole tool 18 is restarted. In the preferred embodiment, the executable code with the error is erased from RAM 25. When the CPU activates, it reads from boot memory 24 in step 45. The boot memory 24 instructs the CPU 23 to look for the operating system in the surface control unit 14. In step 46, the CPU 23 sends a request to the surface control unit 14 for executable code, which will contain code for at least part of the operating system. In another step 47, the surface control unit 14 sends the rewritten executable code to the CPU 23 over the downhole network 29. The signal sent from the surface control unit 14 is directed to the correct downhole tool 18 by the network 29. In the final step 48, the CPU 23 writes the executable code into RAM 25.

Updates may be added to the executable code during rebooting. The updates may fix errors in previous executable code. The errors may be syntax errors, semantic errors, or algorithmic errors. When the CPU 23 requests the operating system's executable code during rebooting, the updates are included as part of the executable code and the error should be removed. If the surface control unit 14 did not have the executable codes for the processor 30, gaining access to the downhole tool's software would require removing the downhole tool string 32 from the borehole. A lot of time is saved by rewriting the software and loading it to the surface control unit 14 and then rebooting the downhole network 29. Preferably, the boot ROM 24 is just large enough to ensure that the executable codes are requested.

Another advantage to using RAM 25 in downhole tools 18 is that RAM 25 is much faster than forms of non-volatile memory. The CPU 23 operates the downhole tool 18 based off the code written in RAM 25. Tools 18 that respond quicker allow data to be sent to the surface quicker. In some situations, as when a high pressure pocket of gas is hit during drilling, an on-site crew needs a warning as soon as possible. Even a warning that arrives several seconds faster could make a critical difference in emergency situations.

Figure 7:
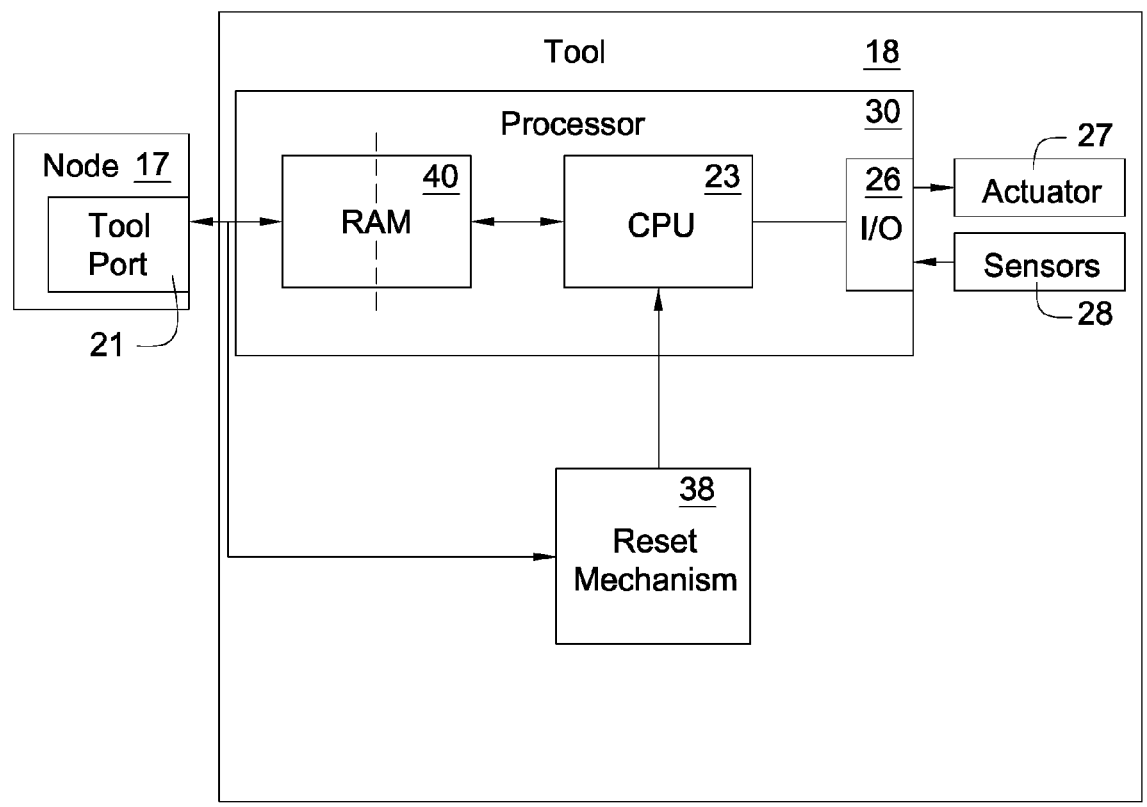
FIG. 7 is a schematic block diagram of another embodiment of a processor in a downhole tool.

FIG. 7 shows an embodiment of a processor 30 in a downhole tool 18 that requires no ROM. No ROM may be achieved by using a dual ported RAM 40. However, certain embodiments comprising no non-volatile memory in the processor 30 comprise a single ported RAM 25. In an embodiment where the processor 30 has no non-volatile memory downhole, the executable codes must be sent to the processors 30 from the surface control unit 14. The node 17 may read off and write to the dual ported RAM 40 in the processor 30 of the downhole tool 18. The CPU 23 of the processor 30 may also read off and write to the dual ported RAM 40. Such a processor may 30 require a design that avoids both the CPU and node 17 from interacting with the dual ported RAM 40 at the same time. A reset mechanism 38 may keep the CPU 23 inactive until the necessary executable codes are loaded into the dual ported RAM 40. When RAM 40 has enough code the reset mechanism 38 activates the CPU 23. In this embodiment the nodes 17 comprise enough intelligence to direct the executable to the correct processors.

Figure 8:
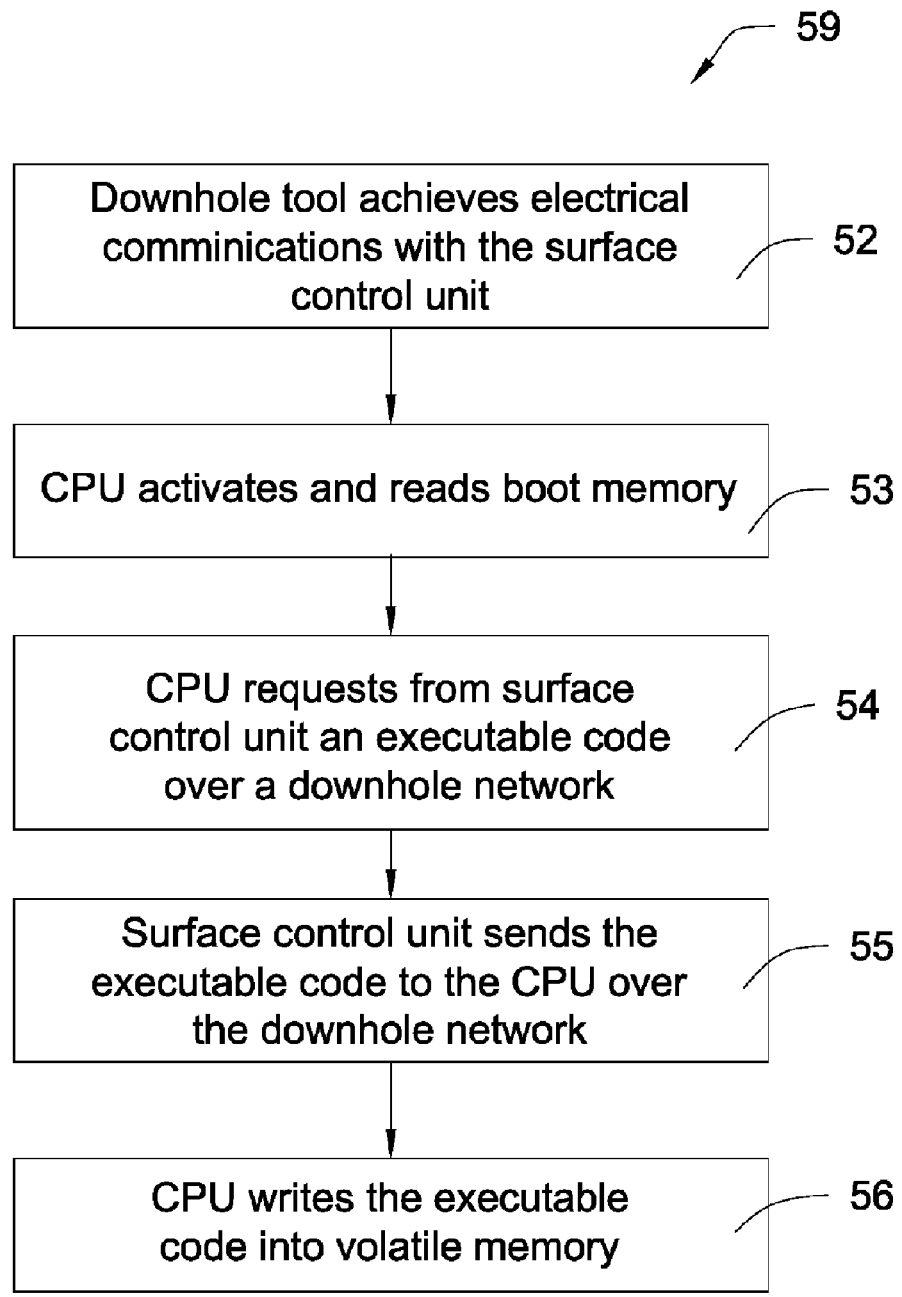
FIG. 8 is a block diagram of an embodiment of a method for loading an executable code.

An embodiment of method 59 is shown in FIG. 8. The first step 52 of method 59 describes the booting process once a downhole tool 18 achieves electrical communication with the surface control unit 14. Typically, electrical communication is achieved when the downhole tool 18 is attached to the data swivel 16. A second step 53 comprises the CPU 23 activating and reading from boot memory 24. The boot memory 24 will direct the CPU 23 to look for executable code in the surface control unit 14 and in the next step 54, the CPU 23 requests from the surface control unit 14 executable code over the downhole network 29. During the next step 55, the surface control unit 14 sends the executable code to the CPU 23 over the downhole network 29. In the final step 56, the CPU 23 writes the executable code into volatile memory.

Preferably, the downhole tools 18 are booted when they are electrically connected to the surface control unit 14. During tripping, a top-hole adapter connects to the uppermost component in the downhole tool string 32, which has a connection to the surface control unit 14. The top-hole adapter may be a data swivel 16 or any electrical connection joining the surface control unit 14 and the downhole tool string 32. Preferably, the top-hole adapter is connected to the component first before it is added to the downhole tool string 32. This allows an immediate connection to the tools 18 already downhole and the crew may communicate with the downhole tools 18 immediately. Also as the downhole tool string 32 is lowered further into the established borehole, if there is an emergency, the on-site crew has access to downhole information immediately. In this scenario, any tool 18 that is attached to the component to be added to the downhole tool string 32 begins loading its operating system's executable codes before it is connected to the downhole tool string 32.

In the preferred embodiment of the present invention, when a tool 18 is added to the downhole tool string 32, the boot ROM 24 may automatically request the executable codes from the surface control unit 14. However, when several sections of pipe are being added or removed, such as during tripping, the electrical connection from the main power source may be lost momentarily. Under these conditions, the downhole tools 18 would be turned on and off every time that connection is lost. Booting and rebooting every tool 18 on the downhole tool string 32 may create packet collisions due to high traffic in the downhole network 29. Preferably every node 17 in the downhole network 29 comprises a power source, which allows the tools 18 to operate in a sleep mode when the connection to the main power source is disrupted. The sleeping mode comprises a low power setting which allows the tools 18 to remain on, but not enough to be operational. The nodes 17 on the downhole tool string 32 may be designed to run in this sleep mode for about 40 days. When a signal from the surface reaches a tool 18 in sleeping mode, the tool 18 wakes up and the tool 18 becomes fully powered for operation. This system saves the tools 18 from rebooting repetitively during activities such as tripping. There may also be a zero power setting option for when no power is needed in the downhole tool string 32.

Figure 9:
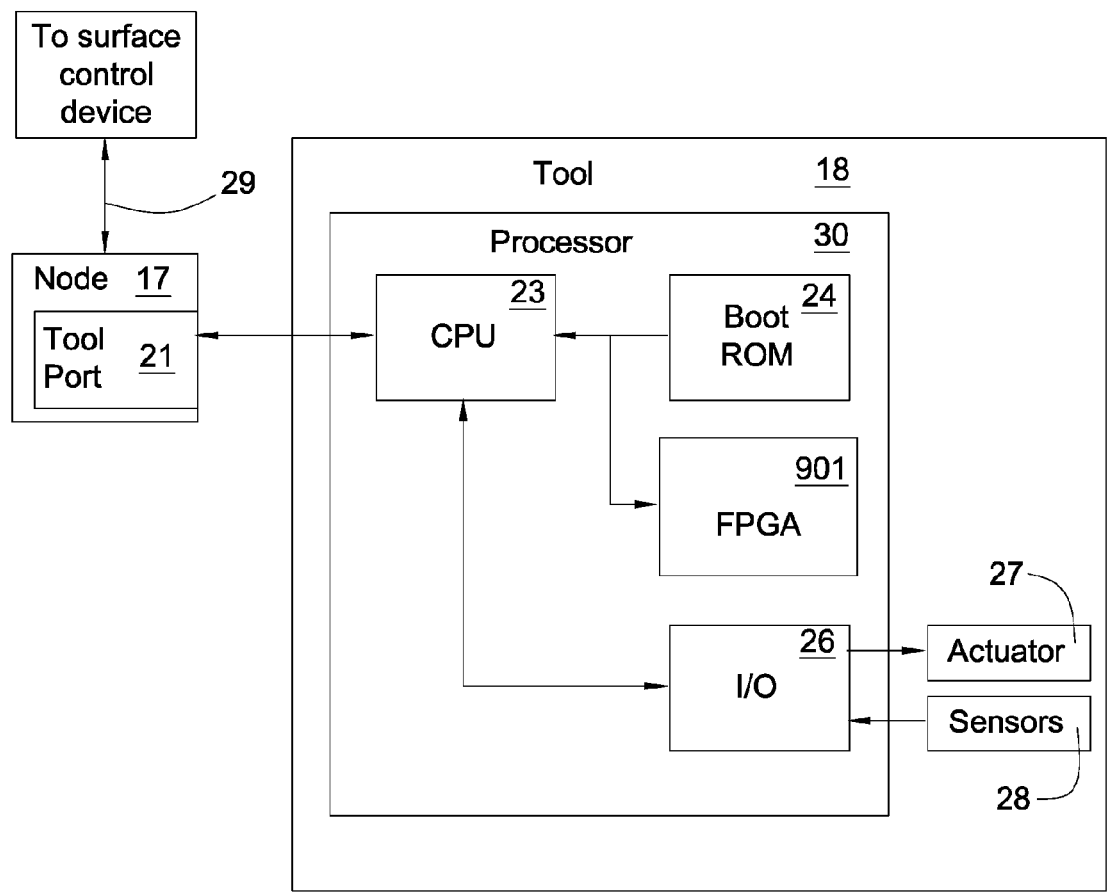
FIG. 9 is a schematic block diagram of an embodiment of a processor with configurable hardware in a downhole tool.

Referring now to FIG. 9, in some embodiments of the invention the executable code may be a hardware configuration for configurable hardware 901 in a downhole tool string component. In the embodiment shown, the downhole tool string component is a tool 18 in communication with a network node 17. In other embodiments, the downhole tool string component may be a component such as a section of drill pipe, a jar, a hammer, a downhole motor, a shock absorber, or a bottom-hole assembly.

The network node 17 is in communication with the surface control unit 14 through the downhole network 29. Preferably the configurable hardware 901 is a field programmable gate array (FPGA) programmable by the CPU 23. The configurable hardware 901 is shown in this figure as part of the processor 30 and in communication with the CPU 23. In other embodiments, the configurable hardware 901 may be separate from but peripherally connected to the processor 30. In such embodiments, the processor 30 may still be adapted to configure the configurable hardware 901.

The configurable hardware 901 may allow the downhole tool 18 to be rather versatile in the tasks it performs downhole, as it may be programmed to perform a variety of hardware-based tasks. For instance, the configurable hardware 901 may be used to perform a first task for a certain period during drilling or well operations and additional tasks during other periods. Some examples of tasks that the configurable hardware 901 may be adapted to perform are processing data, storing data, transmitting data, actuating tools, and processing and storing readings in addition to several other application-specific needs. Separate tasks performed by the configurable hardware 901 may require separate hardware configurations. The surface control unit 14 may send a hardware configuration through the downhole network 29 that is routed to the CPU 23 of the tool 18 from the node 17.

The CPU 23 may be in communication with the configurable hardware 901 and adapted to implement the hardware configuration.

Figure 10:
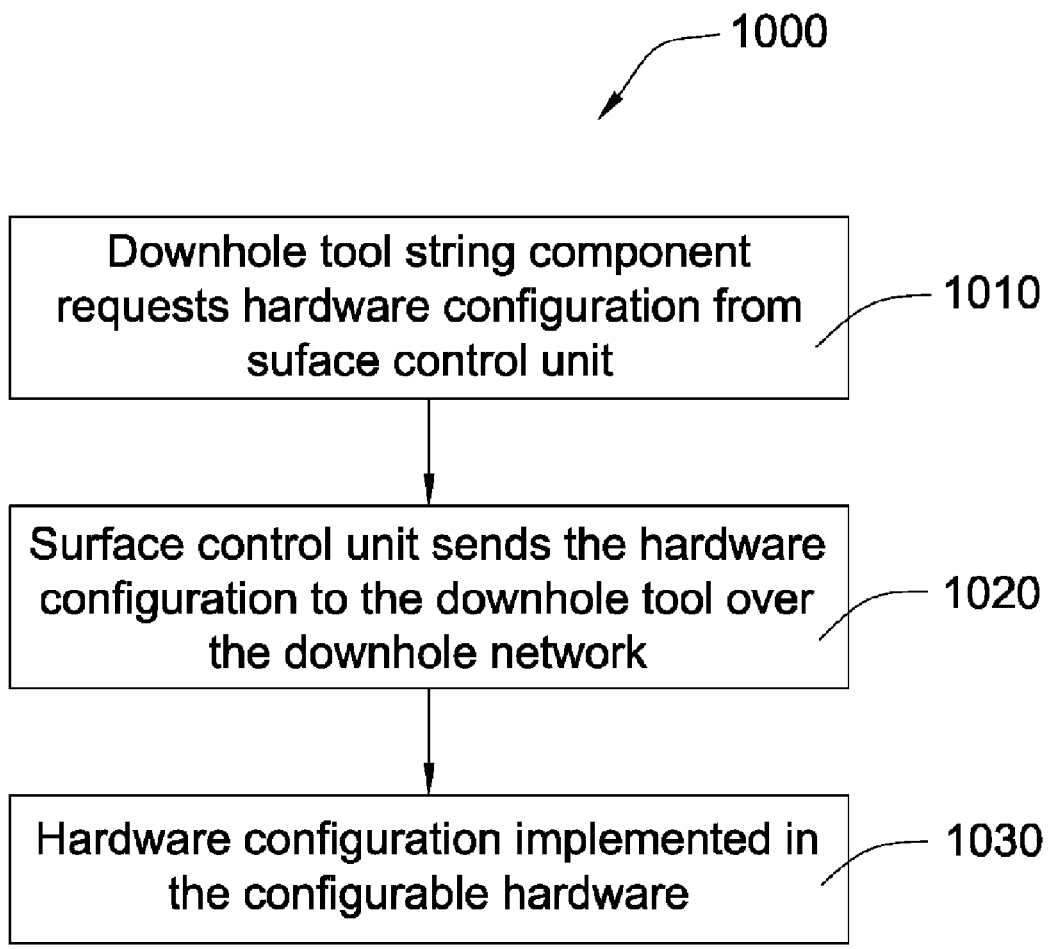
FIG. 10 is a block diagram of an embodiment of a method for adapting configurable hardware to downhole operations in a downhole tool string component.

Referring now to FIG. 10, one embodiment of a method 1000 for adapting configurable hardware 901 to downhole operations includes the downhole tool string component requesting 1010 the hardware configuration from the surface control unit 14. A CPU 23 in the downhole tool string component may transmit the request over the downhole network 29 to the surface control unit 14. The surface control unit 14 transmits 1020 the hardware configuration over the downhole network 29 from the surface control unit 14 to the downhole tool string component and the hardware configuration is implemented 1030 in the configurable hardware 901. In alternate embodiments, the downhole tool component may not need to request 1010 the hardware configuration from the surface control unit 14 to receive an updated hardware configuration. For instance, the surface control unit 14 may send 1020 the hardware configuration to the downhole tool string component when an updated hardware configuration becomes available, or when the specific application of the configurable hardware 901 changes.

Figure 11:
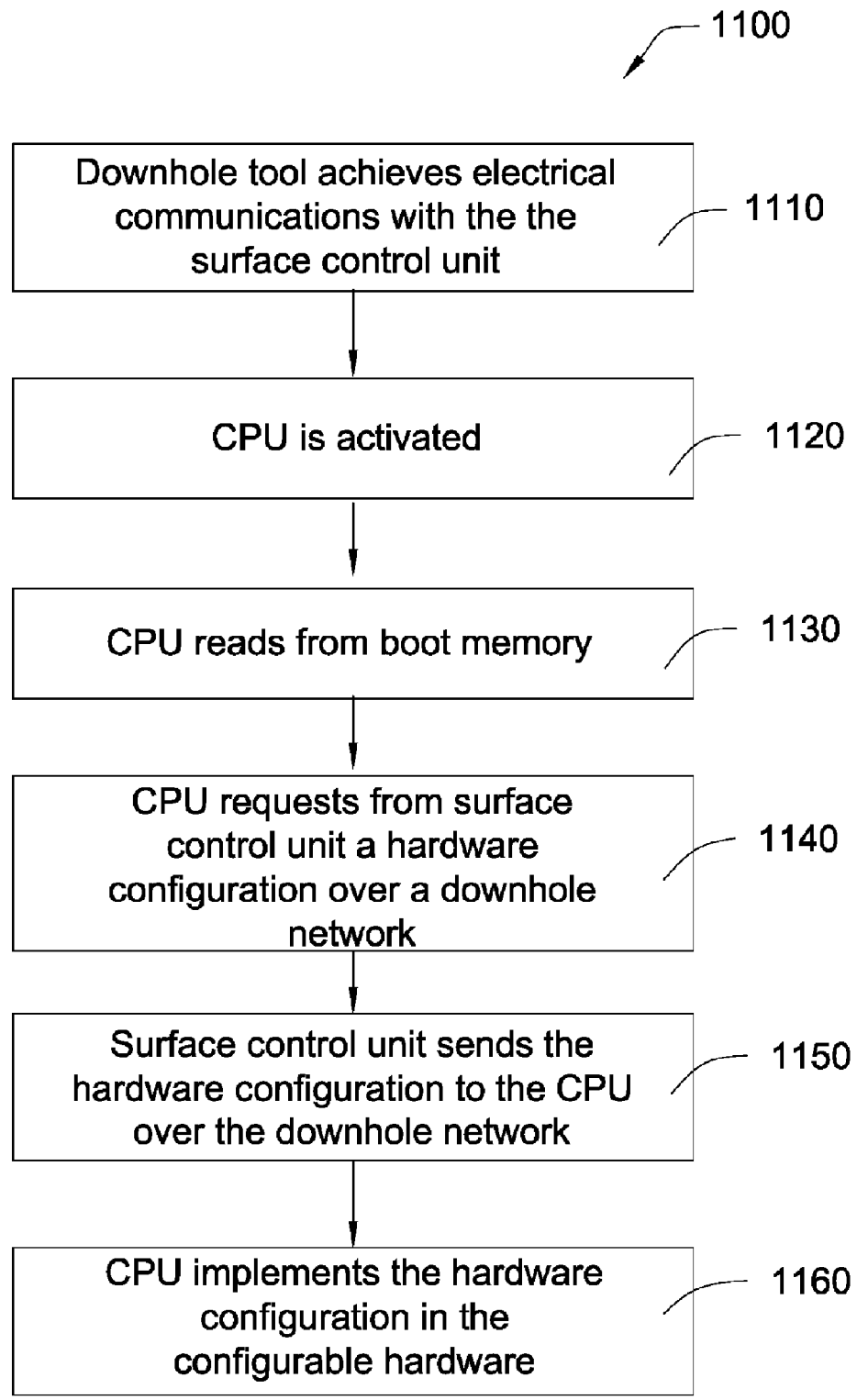
FIG. 11 is a block diagram of another embodiment of a method for adapting configurable hardware to downhole operations in a downhole tool string component.

Referring to FIG. 11, another method 1100 for adapting configurable hardware 901 to downhole operations may include the downhole tool 18 achieving 1110 communication with the surface control unit 14 through the downhole network 29. Upon achieving 1110 communication, the CPU 23 is activated 1120, either by the surface control unit 14 or automatically by an electronic signal from the downhole network 29. Once activated, the CPU 23 then reads 1130 startup instructions from boot memory 24. The startup instructions may direct the CPU 23 to request 1140 a hardware configuration for the configurable hardware 901 over the downhole network 29. Upon receiving the request, the surface control unit 14 may then transmit 1150 the hardware configuration to the CPU 23 over the downhole network 29, which in turn allows the CPU 23 to implement 1160 the hardware configuration in the configurable hardware 901.

The surface control unit 14 may receive the hardware configuration from an external network such as a LAN or the internet. This allows the hardware configuration to be developed and transported from a location remote to the drilling or well site. A developer may discover an improvement to a certain hardware configuration and send a revised or new hardware configuration over the external network to the surface control device 14.

Whereas the present invention has been described in particular relation to the drawings attached hereto, it should be understood that other and further modifications apart from those shown or suggested herein, may be made within the scope and spirit of the present invention.

What is claimed is:

1. A system for loading executable code into a downhole tool string component, comprising:
   a downhole tool string component;
   a surface control unit storing executable code associated with the downhole tool string component;
   a downhole network in communication with the surface control unit and the downhole tool string component;
   the downhole tool string component configured to send a request to the surface control unit identifying the downhole tool string component; and
   the surface control unit configured to retrieve the executable code and transmit the executable code to the downhole tool string component over the downhole network in response to receiving the request.

2. The system of claim 1, wherein the executable code is stored as binary data in the downhole tool string component.

3. The system of claim 1, wherein the downhole tool string component comprises at least one field programmable gate array (FPGA).

4. The system of claim 1, wherein the downhole tool string component is a node in the downhole network.

5. The system of claim 1, wherein the downhole tool string component is a tool in a downhole tool string associated with a network node.

6. The system of claim 1, wherein the downhole tool string component comprises hardware selected from the group consisting of processors, modems, application-specific integrated circuits, and combinations thereof.

7. The system of claim 6, wherein the downhole tool string component is in electrical communication with at least one processor.

8. The system of claim 1, wherein the downhole network comprises a plurality of interconnected wired pipes.

9. The system of claim 1, wherein the surface control unit comprises a connection to an external network selected from the group consisting of a local area network, the internet, a satellite network, and combinations thereof.

10. A method for loading executable code into a downhole tool string component comprising:
    storing, in a surface control unit, executable code for a downhole tool string component, the downhole tool string component communicating with the surface control unit by way of a downhole network;
    transmitting a request from the downhole tool string component to the surface control unit requesting the executable code and identifying the downhole tool string component;
    locating the executable code and transmitting the executable code from the surface control unit to the downhole tool string component in response to receiving the request; and
    receiving and installing the executable code on the downhole tool string component.

11. The method of claim 10, further comprising the downhole tool string component reading an instruction in boot memory to initiate the request.

12. The method of claim 10, wherein transmitting the executable code comprises transmitting the executable code over the downhole network.

13. The method of claim 10, further comprising sending an activation command to the downhole tool string component as soon as the downhole tool string component is in electrical communication with the surface control unit.

14. The method of claim 10, further comprising relaying the executable code through network nodes in the downhole network to the downhole tool string component.

15. The method of claim 10, wherein the surface control unit receives the executable code from an external network.

16. The method of claim 10, wherein the executable code is executed by circuitry in the downhole tool string component.

17. The method of claim 10, wherein the downhole tool string component requests the executable code in response to changing hardware requirements.

18. The system of claim 1, wherein the executable code comprises an operating system.

19. The method of claim 10, wherein the executable code comprises an operating system.

* * * * *